US011122308B2

(12) United States Patent
Wu (10) Patent No.: US 11,122,308 B2
(45) Date of Patent: Sep. 14, 2021

(54) RESOURCE RETRIEVAL METHOD IN AN INTELLIGENT IDENTIFICATION SYSTEM AND INTELLIGENT IDENTIFICATION SYSTEM

(71) Applicant: Wangsu Science & Technology Co., Ltd., Shanghai (CN)

(72) Inventor: Wenqiang Wu, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/726,063

(22) Filed: Dec. 23, 2019

(65) Prior Publication Data

US 2020/0329267 A1 Oct. 15, 2020

Related U.S. Application Data

(63) Continuation of application No. PCT/CN2019/081535, filed on Apr. 4, 2019.

(51) Int. Cl.
*H04N 21/24* (2011.01)
*H04N 21/232* (2011.01)
(Continued)

(52) U.S. Cl.
CPC ............ *H04N 21/24* (2013.01); *H04N 21/232* (2013.01); *H04N 21/4182* (2013.01); *H04N 21/438* (2013.01)

(58) Field of Classification Search
CPC .. H04N 21/24; H04N 21/232; H04N 21/4182; H04N 21/438
See application file for complete search history.

(56) References Cited

U.S. PATENT DOCUMENTS 7,062,561 B1 * 6/2006 Reisman ................. G06F 16/00
709/227
8,219,688 B2 7/2012 Wang
(Continued)

FOREIGN PATENT DOCUMENTS

| CN | 101202882 A | 6/2008 |
| CN | 102447677 A | 5/2012 |

(Continued)

OTHER PUBLICATIONS

Extended European Search Report dated Sep. 11, 2020, Patent Application No. 19820654.2, 9 pages.
(Continued)

*Primary Examiner* — Randy A Flynn
(74) *Attorney, Agent, or Firm* — Davis Wright Tremaine LLP (57) ABSTRACT

The present disclosure relates to a resource retrieval method in an intelligent identification system and an intelligent identification system. Herein, the intelligent identification system is associated with multiple resource servers provided by multiple resource service providers. The method comprises: receiving retrieval information input by a user, and identifying a resource type represented by the retrieval information (S1); determining, in the multiple resource servers, multiple target resource servers corresponding to the resource type, and transmitting the retrieval information to the multiple target resource servers (S3); and receiving retrieved resources fed back by the multiple target resource servers in regard to the retrieval information, and displaying the retrieved resources to the user (S5). The technical solutions provided in the present disclosure may simplify a user's resource acquisition manner.

11 Claims, 3 Drawing Sheets

(51) Int. Cl.
*H04N 21/418* (2011.01)
*H04N 21/438* (2011.01)

(56) References Cited

U.S. PATENT DOCUMENTS

| | | | |
|---|---|---|---|
| 2008/0148192 A1* | 6/2008 | Read | G06F 16/9577 715/854 |
| 2012/0008786 A1* | 1/2012 | Cronk | H04N 21/25875 380/282 |
| 2013/0311997 A1* | 11/2013 | Gruber | G06F 9/4843 718/102 |
| 2015/0206208 A1* | 7/2015 | Sun | H04N 21/2543 705/34 |
| 2016/0239557 A1* | 8/2016 | Glover | G06F 16/3344 |

FOREIGN PATENT DOCUMENTS

| | | |
|---|---|---|
| CN | 103678560 A | 3/2014 |
| CN | 103716326 A | 4/2014 |
| CN | 103944994 A | 7/2014 |
| CN | 104284211 A | 1/2015 |
| CN | 105847320 A | 8/2016 |
| CN | 106612311 A | 5/2017 |
| CN | 108322495 A | 7/2018 |
| CN | 108460060 A | 8/2018 |
| CN | 108647341 A | 10/2018 |
| CN | 108718347 A | 10/2018 |
| CN | 109298936 A | 2/2019 |
| CN | 105446971 B | 3/2019 |
| CN | 109410022 A | 3/2019 |
| EP | 2490131 A1 | 8/2012 |

OTHER PUBLICATIONS

Chinese First Office Action dated Jun. 1, 2020, Patent Application No. 201910169485.X, 15 pages.
International Search Report and Written Opinion dated Dec. 18, 2019, Patent Application No. PCT/CN2019/081535, 8 pages.
Chinese Second Office Action dated Mar. 2, 2021, Patent Application No. 201910169485.X, 4 pages.

* cited by examiner

RESOURCE RETRIEVAL METHOD IN AN INTELLIGENT IDENTIFICATION SYSTEM AND INTELLIGENT IDENTIFICATION SYSTEM

CROSS REFERENCE TO RELATED APPLICATIONS

The present disclosure is a continuation of international application No. PCT/CN2019/081535, filed on Apr. 4, 2019, entitled "RESOURCE RETRIEVAL METHOD IN AN INTELLIGENT IDENTIFICATION SYSTEM AND INTELLIGENT IDENTIFICATION SYSTEM," which claims benefit of Chinese Application No. 201910169485.X filed Mar. 6, 2019, entitled "RESOURCE RETRIEVAL METHOD IN AN INTELLIGENT IDENTIFICATION SYSTEM AND INTELLIGENT IDENTIFICATION SYSTEM," the contents of which are incorporated by reference herein in their entirety.

TECHNICAL FIELD

The present disclosure relates to the field of Internet technology, especially to a resource retrieval method in an intelligent identification system and an intelligent identification system.

BACKGROUND

With people's increasing awareness of copyright, Internet resources are gradually getting protected by copyrights. For different service providers, copyright protection is often applied to some resources. For example, concerning music sections, there are currently multiple music service providers such as Tencent, Alibaba, NetEase and so on. These music service providers usually launch their own music software, from which music resources of users' interest may be found. Each music service provider would generally monopolize certain music resources by purchasing music copyrights. The monopolized music resources can only be provided by a corresponding music service provider, but cannot be found in music software of other music service providers.

In regard to the above-described condition, in order to obtain all resources, a user usually need to download resource software of multiple resource service providers and the user can obtain resources of his/her interest by switching between the varied resource software. In this way, the user's cost of obtaining the resources is undoubtedly increased and such a resource acquisition manner is not convenient enough.

SUMMARY

The present disclosure is intended to provide a resource retrieval method in an intelligent identification system and an intelligent identification system, which may simplify a user's resource acquisition manner.

To realize the above-described objective, in one respect, the present disclosure provides a resource retrieval method in an intelligent identification system. Herein the intelligent identification system is associated with multiple resource servers provided by multiple resource service providers. The method includes: receiving retrieval information input by a user, and identifying a resource type represented by the retrieval information; determining, in the multiple resource servers, multiple target resource servers corresponding to the resource type, and transmitting the retrieval information to the multiple target resource servers; and receiving retrieved resources fed back by the multiple target resource servers in regard to the retrieval information, and displaying the retrieved resources to the user.

To realize the above-described objective, in another respect, the present disclosure provides an intelligent identification system associated with multiple resource servers provided by multiple resource service providers. The intelligent identification system includes: a retrieval information input unit configured to receive retrieval information input by a user, and identify a resource type represented by the retrieval information; a resource retrieval unit configured to determine, in the multiple resource servers, multiple target resource servers corresponding to the resource type, and transmit the retrieval information to the multiple target resource servers; and a resource display unit configured to receive retrieved resources fed back by the multiple target resource servers in regard to the retrieval information, and display the retrieved resources to the user.

Accordingly, the technical solutions provided by the present disclosure may associate multiple resource servers provided by different resource service providers to one intelligent identification system, so that the intelligent identification system may provide a unified retrieval entrance to the user. After the user inputs the retrieval information through the retrieval entrance, the intelligent identification system may preferentially identify the resource type represented by the retrieval information. For example, the intelligent identification system may identify whether the user intends to retrieve music or a video or an article. After the resource type is identified, the intelligent identification system may transmit the retrieval information to a corresponding target resource server for processing. Specifically, if the intelligent identification system identifies that the user currently intends to retrieve a video resource, the retrieval information may be transmitted to resource servers of the service providers such as Youku Video, Tencent Video, and Iqiyi Video for processing. After each of the target resource servers processes and generates retrieved resources, the retrieved resources may be fed back to the intelligent identification system. In this way, the intelligent identification system may display the retrieved resources to the user for selection. In view of above, the present disclosure provides a unified intelligent identification system, and the user may obtain the retrieved resources of interest without downloading multiple different resource software, thereby reducing the user's use cost and simplifying the user's retrieval.

BRIEF DESCRIPTION OF THE DRAWINGS

In order to describe the technical solutions of the embodiments of the present disclosure more clearly, drawings used in description of the embodiments will be briefly described below. It is evident that the drawings in the following description are only some embodiments of the present disclosure. For those skilled in the art, other drawings may also be obtained from those drawings without an inventive effort.

DETAILED DESCRIPTION

In order to make the objective, technical solutions and advantages of the present disclosure clearer, embodiments of the present disclosure will be further described in detail below with reference to the accompanying drawings.

The present disclosure provides a resource retrieval method in an intelligent identification system which may communicate with multiple resource servers provided by different resource service providers. The resource servers provided by the different resource service providers may be classified by resource type. In practical applications, resource types may be represented by various tags such as animation, music, dance, life, digital, fashion and so on. It shall be noted that an identical resource may be included in resources of different types. For example, a resource of a music video may be included in three different resource types, such as animation, music and fashion. Therefore, different resource servers may include repetitive resources. Besides, one resource type may be included in multiple resource servers provided by different resource service providers. For example, under the resource type of "music", there may be three or more resource servers provided by three resource service providers, such as Tencent, Alibaba and NetEase.

In this embodiment, after the different resource servers are divided by resource type, the different resource servers all communicate with the intelligent identification system. Specifically, the intelligent identification system may provide a third-party interface, and at the same time, the resource server may further enable its own interface to communicate with the intelligent identification system, and data communication may be performed between the intelligent identification system and the resource server based on a current or customized network communication protocol. In this way, the intelligent identification system may be associated with multiple resource servers provided by multiple resource providers.

Figure 1:
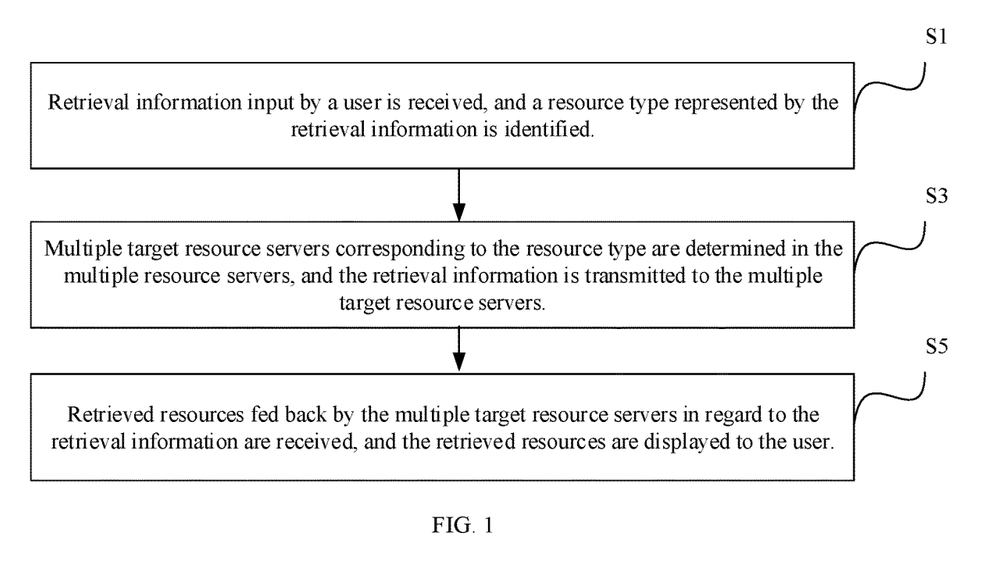
FIG. 1 shows a schematic diagram of steps of a resource retrieval method in an embodiment of the present disclosure.

With reference to FIG. 1, the resource retrieval method in the intelligent identification system provided in the present disclosure may include the following steps.

S1: Retrieval information input by a user is received, and a resource type represented by the retrieval information is identified.

In this embodiment, the intelligent identification system may receive the retrieval information input by the user through an information input component such as a microphone, a camera, a touch screen, a keyboard, or the like. Correspondingly, the retrieval information input by the user may be any one of or any combination of text, picture, audio and video. After the retrieval information input by the user is received, the intelligent identification system may identify the resource type represented by the retrieval information. Specifically, with reference to FIG. 2, the intelligent identification system may be associated with multiple resolution servers provided by multiple resolution service providers in addition to being associated with multiple resource servers. The resolution server may be configured to parse the retrieval information input by the user, thereby extracting a retrieval keyword from the retrieval information. In order to be able to parse retrieval information of different types, the types of resolution servers may also be diversified. The multiple resolution servers may be divided by information type of the retrieval information. The information type may be at least one of the above-described text, picture, video and audio. In this way, after the division by information type, there may be a resolution server for semantic parsing, a resolution server for image analysis, a resolution server for voice information recognition, and a resolution server for video frame analysis. Naturally, in practically applications, some resolution servers may be provided with the above-described multiple functions, and these resolution servers may be included in multiple information types at the same time.

Figure 2:
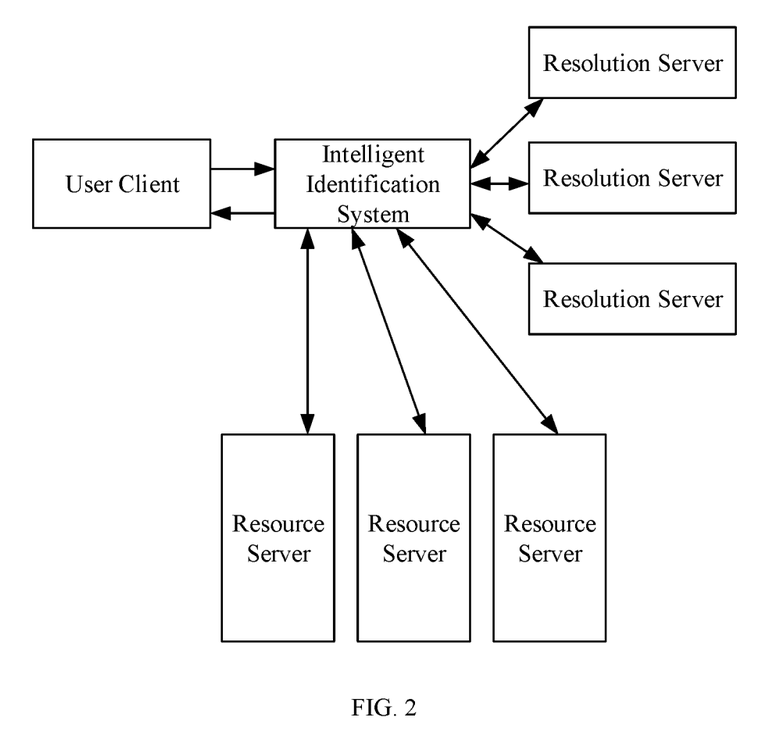
FIG. 2 shows a schematic diagram of a network architecture of an intelligent identification system in an embodiment of the present disclosure.

In this embodiment, after the retrieval information input by the user is received, the intelligent identification system may identify the information type of the retrieval information, and determine a target resolution server corresponding to the information type among the plurality of resolution servers. Specifically, the intelligent identification system may use the resolution server classified to the information type as the above-described target resolution server according to the identified information type. Thereafter, the intelligent identification system may transmit the retrieval information to the target resolution server to parse the retrieval keyword included in the retrieval information through the target resolution server. Finally, the intelligent identification system may receive the retrieval keyword fed back by the target resolution server.

In practical applications, for the retrieval information of different information types, the resolution server may perform a parsing process of the retrieval keyword in different manners. For example, if the user inputs text, the resolution server may parse semantics of the text through the Natural Language Processing (NLP) technique, and extract the retrieval keyword in the text according to parsed semantics. For another example, if the user inputs a picture or a video, the resolution server may analyze image features in the picture or a video frame according to an image semantic segmentation algorithm, and may use an extracted image feature as the retrieval keyword. For still another example, if the user inputs voice, the resolution server may convert the voice into text through a voice recognition technique, parse the semantics of the text through the NLP technique, and extract the retrieval keyword in the text according to the parsed semantics.

In this embodiment, after the retrieval keyword is identified, it may be determined which type of retrieved resource the user is currently retrieving according to the semantics of the retrieval keyword. Specifically, different retrieval keywords may have different types of tags, and a resource type corresponding to the retrieval keyword may be obtained based on the tag of type of the retrieval keyword. For example, the retrieval keyword, "falling into you", has a music tag, so what the user is to retrieve is a retrieved resource of a music type. In this way, the resource type represented by the retrieval information may be determined based on the retrieval information input by the user.

S3: Multiple target resource servers corresponding to the resource type are determined in the multiple resource servers, and the retrieval information is transmitted to the multiple target resource servers.

In this embodiment, after the resource type represented by the retrieval information is identified, the resource servers classified into the resource type may be regarded as multiple target resource servers corresponding to the resource type. Thereafter, the intelligent identification system may transmit the retrieval information or the retrieval keyword extracted according to the retrieval information to the multiple target resource servers.

S5: Retrieved resources fed back by the multiple target resource servers in regard to the retrieval information are received, and the retrieved resources are displayed to the user.

In this embodiment, after the retrieval information or the retrieval keyword is received, each target resource server may retrieve resources matching the retrieval information or the retrieval keyword from a resource repository in accordance with a retrieval strategy of the each target resource server per se, and feed the retrieved resources back to the intelligent identification system.

In this embodiment, after the retrieved resources fed back by the target resource server are received, the intelligent identification system may display the retrieved resources to the user. It shall be noted that, in regard to the same retrieval information, the intelligent identification system may receive retrieved resources fed back by the multiple target resource servers, and thus there may be a plurality of retrieved resources displayed to the user. In this way, the user may select one or more of the retrieved resources for browsing according to the user's own judgment and need.

In practical applications, the target resource servers may only provide links to the retrieved resources to the intelligent identification system. When the links are triggered by the user, the retrieved resources may be directly provided to the user by the target resource server, thereby preventing retrieved resources with large quantity of data from being transmitted frequently in a network. Instead, the retrieved resources with large quantity of data are directly provided to the client of the user by the target resource servers. Specifically, when the user selects a link of a retrieved resource in the intelligent identification system, the intelligent identification system may transmit prompt information to a target resource server corresponding to the selected retrieved resource. The prompt information may include a network address of the client of the user. In this way, the target resource server may transmit the retrieved resource to the client of the user by the network address. That is, the intelligent identification system may determine the target retrieved resource selected by the user from displayed retrieved resources, and provide the target retrieved resource to the user through the resource server corresponding to the target retrieved resource.

In practical applications, in order to improve response speed of a retrieval process, improvements may be made in multiple aspects. On the one hand, communications between the above-described client of a user, the resource server, the resolution server and the intelligent identification system may be accelerated through a content delivery network (CDN). Specifically, communications between the client of the user and the intelligent identification system, between the client of the user and each of the resource servers, between the intelligent identification system and each of the resource servers, and between the intelligent identification system and each of the resolution servers may be accelerated through the CDN.

On the other hand, while a user is inputting the retrieval information, the retrieval information may be parsed in real time. Specifically, in the process of receiving the retrieval information input by the user, an information segment of the retrieval information received at a current time may be transmitted to the target resolution server to parse a partial retrieval keyword included in the information segment through the target resolution server. For example, if a complete piece of retrieval information that the user intends to input is "I'd like to retrieve Jay Chou's The Cowboy is Busy, title song of his latest album", when "I'd like to retrieve Jay Chou" is input, this information segment may be directly transmitted to the target resolution server, then the target resolution server may obtain by parsing that the partial retrieval keyword is "Jay Chou". In this way, along with the retrieval information getting completed, when the completed retrieval information input by the user is received by the intelligent identification system, the target resolution server may obtain partial retrieval keywords at different periods of the inputting. For example, concerning the above-described retrieval information, a plurality of partial retrieval keywords such as "Jay Chou", "The Cowboy is Busy", "title song" and "album" may be obtained at different periods. Later, the target resolution server may generate retrieval keywords of the retrieval information based on the respective partial retrieval keywords. Specifically, a combination of the partial retrieval keywords may be used as final retrieval keywords, or the partial retrieval keywords may be sorted based on their weight values so as to select partial retrieval keywords with higher weight values and use the selected partial retrieval keywords as the final retrieval keywords. For example, in the above-described example, "The Cowboy is Busy" with the highest weight value may be used as the final retrieval keywords. In this way, this manner of inputting while parsing, rather than performing parsing after the user inputs the complete retrieval information, may improve the speed of parsing the retrieval information.

In one embodiment, it is taken into consideration that in the existing technology, a user may have to pay multiple resource service providers if the user needs to obtain resources from the whole Internet, which will increase invested cost of the user and burden to operation. In view of this, in this embodiment, a unified payment entrance may be configured in the intelligent identification system. A user may pay a resource retrieval fee to the intelligent identification system through the unified payment entrance rather than paying each of the resource service providers. Afterwards, in order to compensate the resource service provider with a copyright fee, the intelligent identification system may allocate the resource retrieval fee or a part of the resource retrieval fee among the multiple resource service providers according to times the retrieved resource is adopted by a user.

Specifically, after the retrieved resource is presented to a user, the intelligent identification system may determine the target retrieved resource selected by the user from the displayed retrieved resources, and identify a target resource service provider corresponding to the target retrieved resource to count the times the retrieved resources provided by each resource service provider are adopted by a user. For example, if a payment cycle is 7 days, the intelligent identification system may count total times the resources provided by the each resource service providers are adopted by a user. Afterwards, the intelligent identification system may determine fee division ratios of the each resource service provider according to the times the retrieved resources provided by the each resource service provider are adopted by a user. The fee division ratios may be ratios of times the resources are adopted. For example, currently, there are three resource service providers who provide resources that are adopted 500 thousand times, 100 thousand times and 400 thousand times respectively. Accordingly, a fee division ratio among the three resource service providers may be 5:1:4, and their respective fee division ratios are 50%, 10% and 40%. In this way, the intelligent identification system may receive the resource retrieval fee paid by a user in the intelligent identification system, and may allocate the resource retrieval fee or part of the resource retrieval fee to the each resource service provider in accordance with the fee division ratios.

Naturally, for parsing services provided by parsing service providers, the intelligent identification system may otherwise count times each parsing service provider provides parsing services within a designated cycle, and determine division ratios of the each parsing service providers according to the times of the parsing services. Finally, the intelligent identification system may allocate a partial resource retrieval fee to the each parsing service providers according to the division ratios of the each parsing service provider.

In practical applications, in order to improve security of statistical data, the blockchain technique may be employed to generate data for each retrieval process. Specifically, after the retrieved resources fed back by the multiple target resource servers in regard to the retrieval information are received, the intelligent identification system generates and stores a unique identifier for marking a current retrieval process. In practical applications, the unique identifier may be a hash value. Data for calculating the hash value may be a parsing result obtained by the resolution server, a duration required for the parsing, a retrieved resource fed back by the resource server, and a retrieved resource selected by a user and the like. Those data may be binary or hexadecimal, and may be calculated through a hash algorithm to obtain a hash value which may be used as the above-describe unique identifier. In this way, each retrieval process may generate a unique identifier. Based on the unique identifier and data involved in the retrieval process such as the parsing result, the duration required for the parsing, the retrieved resource fed back by the resource server, and the retrieved resource selected by a user, a block of the current retrieval process may be generated. Herein, the unique identifier may be located at the head of the block, and the data involved in the retrieval process may be located in the body of the block. In this way, different retrieval processes may correspond to different blocks which may form a blockchain to be stored in the Internet, thereby ensuring that the data of the retrieval process is not easily tampered, and thereby guaranteeing subsequent profit division. In this way, based on the unique identifier obtained through the above calculation, the corresponding block may be obtained through query, thereby identifying the data in the block body. Based on these data, the resource retrieval fee paid by a user in the intelligent identification system may be allocated to the each target resource server.

In one embodiment, since quality or accuracy of the retrieved resources provided by different resource providers vary, a user may also have different feedbacks on the retrieved resources, and the feedbacks may be represented by the times the retrieved resources are adopted by a user. In this embodiment, the intelligent identification system may assess a priority of a resource service provider in regard to behavior of a user. Specifically, the intelligent identification system may determine resource display priorities of each resource service provider according to the times the retrieved resources provided by the each resource service provider are adopted by a user. Herein, the more times the retrieved resources are adopted by a user, the higher the priorities of the resources. As a result, when the intelligent identification system redisplays the retrieved resources provided by the each resource service provider to a user, the displayed retrieved resources may be sorted according to the resource display priorities, and retrieved resources with higher resource display priorities may be displayed to a user preferentially, thereby providing the user with retrieved resources of higher quality.

Figure 3:
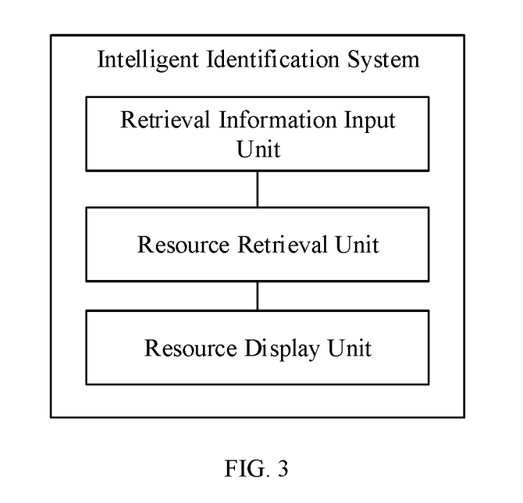
FIG. 3 shows a schematic diagram of functional modules in the intelligent identification system in an embodiment of the present disclosure.

With reference to FIG. 3, the present disclosure further provides an intelligent identification system. Herein the intelligent identification system is associated with multiple resource servers provided by multiple resource service providers. The intelligent identification system includes:

a retrieval information input unit configured to receive retrieval information input by a user, and identify a resource type represented by the retrieval information;

a resource retrieval unit configured to determine, in the multiple resource servers, multiple target resource servers corresponding to the resource type, and transmit the retrieval information to the multiple target resource servers; and a resource display unit configured to receive retrieved resources fed back by the multiple target resource servers in regard to the retrieval information, and display the retrieved resources to the user.

In one embodiment, the intelligent identification system is further associated with multiple resolution servers provided by multiple parsing service providers; and correspondingly, the intelligent identification system further includes:

a retrieval information parsing unit configured to identify an information type of the retrieval information, and determine a target resolution server corresponding to the information type among the multiple resolution servers. Herein the information type include at least one of a text, a picture, a video and an audio;

a keyword receiving unit configured to transmit the retrieval information to the target resolution server to parse a retrieval keyword contained in the retrieval information through the target resolution server, and receive the retrieval keyword fed back by the target resolution server; and correspondingly, the retrieval information input unit configured to identify the resource type represented by the retrieval keyword, and the resource retrieval unit configured to transmit the retrieval keyword to the multiple target resource servers, and the resource display unit configured to receive retrieved resources fed back by the multiple target resource servers in regard to the retrieval keyword.

In one embodiment, the intelligent identification system further includes:

an adoption times counting unit configured to determine a target retrieved resource selected by a user from the displayed retrieved resources, and identify a target resource service provider corresponding to the target retrieved resource to count the times the retrieved resources provided by each resource service provider are adopted by a user.

In one embodiment, the intelligent identification system further includes:

a division ratio determining unit configured to determine fee division ratios of the each resource service provider according to the times the retrieved resources provided by the each resource service provider are adopted by a user;

a unified payment unit configured to receive a resource retrieval fee paid by a user in the intelligent identification system, and allocate the resource retrieval fee or part of the resource retrieval fee to the each resource service provider in accordance with the fee division ratios.

In one embodiment, the intelligent identification system further includes:

a display priority determining unit configured to determine a resource display priority of each resource service provider according to the times the retrieved resources provided by the each resource service provider are adopted by a user;

a resource sorting unit configured to sort the displayed retrieved resources according to the resource display priority when the retrieved resources provided by the each resource service provider are redisplayed to a user.

In one embodiment, the intelligent identification system further includes:

an identifier generating unit configured to generate and store a unique identifier for marking a current retrieval process, so as to allocate the resource retrieval fee paid by a user in the intelligent identification system among each of the multiple target resource servers based on the unique identifier.

In one embodiment, communications between a client of a user and the intelligent identification system, between the client of the user and each of the resource servers, and between the intelligent identification system and each of the resource servers are accelerated through a content delivery network.

Figure 4:
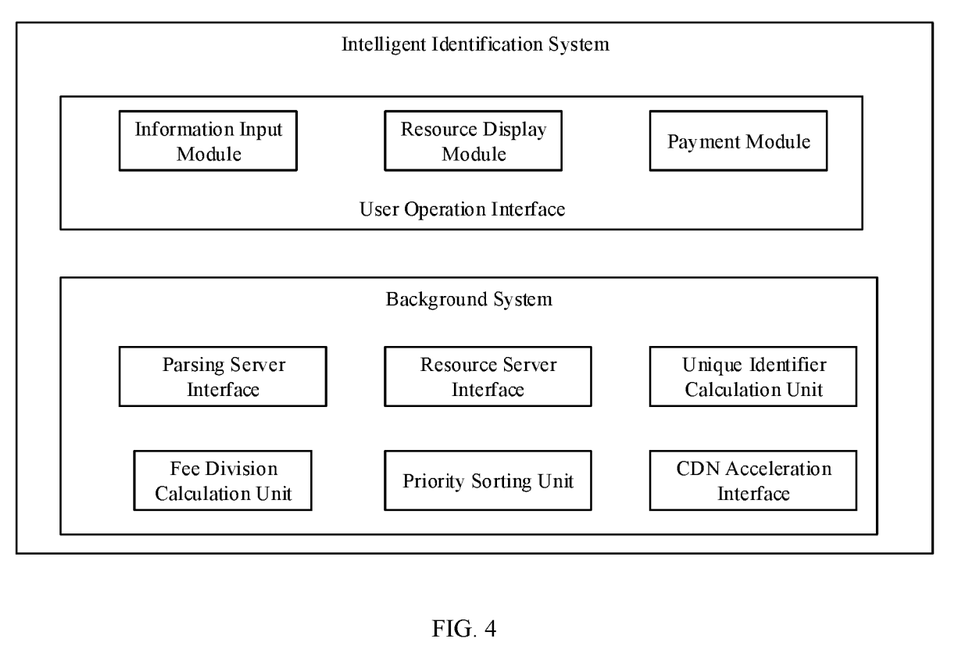
FIG. 4 shows a schematic diagram of inner components in the intelligent identification system in an embodiment of the present disclosure.

Specifically, with reference to FIG. 4, and in one example, an intelligent identification system may provide an information input module, a resource display module, and a payment module to a user. Herein the information input module may receive the retrieval information input by a user, the resource display module may display the respective retrieved resources (or links to the retrieved resources) to a user, and the payment module may receive the resource retrieval fee paid by a user. In a background of the intelligent identification system, there may be a resolution server interface, a resource server interface, a unique identifier calculation unit, a fee division calculation unit, a priority sorting unit, a CDN acceleration interface and the like. For a user, the intelligent identification system may provide a unified retrieval entrance, resource display exit and payment entrance, and background parsing of retrieval information, background acquisition of retrieved resources and background profit division, and the like, which the user is unaware of. In this way, by downloading software of the intelligent identification system, a user may obtain resources from the whole Internet without having to perform varied payments for different resources, which significantly simplifies a user's operation procedure and reduces invested cost by a user.

Accordingly, the technical solutions provided by the present disclosure may associate multiple resource servers provided by different resource service providers to one intelligent identification system, so that the intelligent identification system may provide a unified retrieval entrance to a user. After the user inputs the retrieval information into the retrieval entrance, the intelligent identification system may preferentially identify the resource type represented by the retrieval information. For example, the intelligent identification system may identify whether the user intends to retrieve music or a video or an article. After the resource type is identified, the intelligent identification system may transmit the retrieval information to a corresponding target resource server for processing. Specifically, if the intelligent identification system identifies that the user currently intends to retrieve a video resource, the retrieval information may be transmitted to resource servers of the service providers such as Youku Video, Tencent Video, and Iqiyi Video for processing. After each of the target resource servers processes and generates retrieved resources, the retrieved resources may be fed back to the intelligent identification system. In this way, the intelligent identification system may display the retrieved resources to the user for selection. In view of above, the present disclosure provides a unified intelligent identification system, and the user may obtain the retrieved resources of interest without downloading multiple different resource software, thereby reducing a user's use cost and simplifying a user's retrieval.

Based the above-described embodiments, those skilled in the art may clearly understand that the embodiments may be implemented by means of software plus a necessary general hardware platform, and naturally, may otherwise be implemented by hardware. Based on such perception, the above-described technical solutions or those contributing to the existing technology may be embodied by software products. The computer software product may be stored in a computer-readable storage medium such as a ROM/RAM, a magnetic Disc, an optical disc, etc. and includes a plurality of instructions enabling a computer device (which may be a personal computer, a server, a network device or the like) to implement the methods of the respective embodiments or some parts of the embodiments.

The above-described are only preferred embodiments of the present disclosure, and are not intended to impose a limitation to the present disclosure. Any modifications, equivalent substitutions and improvements, etc., which are included in the spirit and principles of the present disclosure, shall be included in the scope of protection of the present disclosure.

What is claimed is:

1. A resource retrieval method in an intelligent identification system, wherein the intelligent identification system is associated with multiple resource servers provided by multiple resource service providers, the method comprising:

receiving retrieval information input by a user, and identifying a resource type represented by the retrieval information;

determining, in the multiple resource servers, multiple target resource servers corresponding to the resource type, and transmitting the retrieval information to the multiple target resource servers; and receiving retrieved resources fed back by the multiple target resource servers in regard to the retrieval information, and displaying the retrieved resources to the user;

wherein, after the received retrieved resources are displayed to the user, the method further includes:

determining a target retrieved resource selected by the user from the displayed retrieved resources, and identifying a target resource service provider corresponding to the target retrieved resource to count times the retrieved resources provided by each resource service provider are adopted by a user;

determining fee division ratios of the each resource service provider according to the times that the retrieved resources provided by the each resource service provider are adopted by a user; and receiving a resource retrieval fee paid by a user in the intelligent identification system, and allocating the resource retrieval fee or part of the resource retrieval fee to the respective resource service providers in accordance with the fee division ratios;

wherein the intelligent identification system is further associated with multiple resolution servers provided by multiple parsing service providers; and correspondingly, after the retrieval information input by the user is received, the method further comprises:

identifying an information type of the retrieval information, and determining a target resolution server corresponding to the information type among the multiple resolution servers; transmitting the retrieval information to the target resolution server to parse a retrieval keyword contained in the retrieval information through the target resolution server, and receiving the retrieval keyword fed back by the target resolution server; and correspondingly, identifying the resource type represented by the retrieval keyword, and transmitting the retrieval keyword to the multiple target resource servers, and receiving retrieved resources fed back by the multiple target resource servers in regard to the retrieval keyword.

2. The method according to claim 1, wherein the method further comprises:

transmitting, in the process of receiving the retrieval information input by the user, an information segment of the retrieval information received at a current time to the target resolution server, so as to parse a partial retrieval keyword included in the information segment through the target resolution server, until complete retrieval information input by the user is received and the target resolution server generates a retrieval keyword of the retrieval information based on each partial retrieval keyword.

3. The method according to claim 1, wherein the method further comprises:

determining a resource display priority of each resource service provider according to the times the retrieved resources provided by the each resource service provider are adopted by a user; and sorting the displayed retrieved resources according to the resource display priority when the retrieved resources provided by the each resource service provider are redisplayed to a user.

4. The method according to claim 1, wherein, after the retrieved resources fed back by the multiple target resource servers in regard to the retrieval information are received, the method further comprises:

generating and storing a unique identifier for marking a current retrieval process, so as to allocate the resource retrieval fee paid by a user in the intelligent identification system to each of the multiple target resource servers based on the unique identifier.

5. The method according to claim 1, wherein, after the received retrieved resources are displayed to the user, the method further comprises:

determining the target retrieved resource selected by a user from the displayed retrieved resources, and providing the user with the target retrieved resource through the resource server corresponding to the target retrieved resource.

6. The method according to claim 1, wherein communications between a client of a user and the intelligent identification system, between the client of the user and each of the resource servers, and between the intelligent identification system and each of the resource servers are accelerated through a content delivery network.

7. An intelligent identification system, wherein the intelligent identification system is associated with multiple resource servers provided by multiple resource service providers, the intelligent identification system comprises:

at least one processor; and a memory communicationally connected to the at least one processor;

wherein, the memory stores executable instructions; the instructions, when executed by the at least one processor, cause the system to perform a resource retrieval method comprising:

receiving retrieval information input by a user, and identifying a resource type represented by the retrieval information;

determining, in the multiple resource servers, multiple target resource servers corresponding to the resource type, and transmitting the retrieval information to the multiple target resource servers; and receiving retrieved resources fed back by the multiple target resource servers in regard to the retrieval information, and displaying the retrieved resources to the user;

wherein, after the received retrieved resources are displayed to the user, the method further includes:

determining a target retrieved resource selected by the user from the displayed retrieved resources, and identifying a target resource service provider corresponding to the target retrieved resource to count times the retrieved resources provided by each resource service provider are adopted by a user;

determining fee division ratios of the each resource service provider according to the times that the retrieved resources provided by the each resource service provider are adopted by a user; and receiving a resource retrieval fee paid by a user in the intelligent identification system, and allocating the resource retrieval fee or part of the resource retrieval fee to the each resource service provider in accordance with the fee division ratios:

wherein the intelligent identification system is further associated with multiple resolution servers provided by multiple parsing service providers; and correspondingly, the resource retrieval method further comprises:

identifying an information type of the retrieval information, and determining a target resolution server corresponding to the information type among the multiple resolution servers; wherein the information type includes at least one of a text, a picture, a video and an audio;

transmitting the retrieval information to the target resolution server to parse a retrieval keyword contained in the retrieval information through the target resolution server, and receiving the retrieval keyword fed back by the target resolution server; and correspondingly, identifying the resource type represented by the retrieval keyword, transmitting the retrieval keyword to the multiple target resource servers, and receiving retrieved resources fed back by the multiple target resource servers in regard to the retrieval keyword.

8. The intelligent identification system according to claim 7, wherein resource retrieval method further comprises:

determining a resource display priority of each resource service provider according to the times the retrieved resources provided by the each resource service provider are adopted by a user; and sorting the displayed retrieved resources according to the resource display priority when the retrieved resources provided by the each resource service provider are redisplayed to a user.

9. The intelligent identification system according to claim 7, wherein resource retrieval method further comprising:

generating and storing a unique identifier for marking a current retrieval process, so as to allocate the resource retrieval fee paid by a user in the intelligent identification system to the each target resource server based on the unique identifier, wherein the unique identifier is a hash value.

10. The intelligent identification system according to claim 7, wherein communications between a client of a user and the intelligent identification system, between the client of the user and each of the resource servers, and between the intelligent identification system and each of the resource servers are accelerated through a content delivery network.

11. A non-transitory computer-readable storage medium storing executable instructions; wherein, the instructions, when executed by a processor of an intelligent identification system, cause the intelligent identification system to at least perform a resource retrieval method comprising:
  receiving retrieval information input by a user, and identifying a resource type represented by the retrieval information;
  determining multiple target resource servers corresponding to the resource type, and transmitting the retrieval information to the multiple target resource servers; and
  receiving retrieved resources fed back by the multiple target resource servers in regard to the retrieval information, and displaying the retrieved resources to the user;
  wherein, after the received retrieved resources are displayed to the user, the method further includes:
    determining a target retrieved resource selected by the user from the displayed retrieved resources, and identifying a target resource service provider corresponding to the target retrieved resource to count times the retrieved resources provided by each resource service provider are adopted by a user;
    determining fee division ratios of the each resource service provider according to the times that the retrieved resources provided by the each resource service provider are adopted by a user; and
    receiving a resource retrieval fee paid by a user in the intelligent identification system, and allocating the resource retrieval fee or part of the resource retrieval fee to the respective resource service providers in accordance with the fee division ratios;
  wherein the intelligent identification system is further associated with multiple resolution servers provided by multiple parsing service providers; and correspondingly, after the retrieval information input by the user is received, the method further comprises:
    identifying an information type of the retrieval information, and determining a target resolution server corresponding to the information type among the multiple resolution servers; transmitting the retrieval information to the target resolution server to parse a retrieval keyword contained in the retrieval information through the target resolution server, and receiving the retrieval keyword fed back by the target resolution server; and
    correspondingly, identifying the resource type represented by the retrieval keyword, and transmitting the retrieval keyword to the multiple target resource servers, and receiving retrieved resources fed back by the multiple target resource servers in regard to the retrieval keyword.

* * * * *